United States Patent
Davies et al.

(12) 
(10) Patent No.: US 6,306,186 B1
(45) Date of Patent: Oct. 23, 2001

(54) OIL ADDITIVES COMPOSITIONS AND POLYMERS FOR USE THEREIN

(75) Inventors: Brian William Davies, Blewbury; Ramah Jessica Brod, Abingdon, both of (GB); Jan Bock, Warren, NJ (US); Tuncel Ibrahim, Abingdon (GB)

(73) Assignee: Exxon Chemical Patents Inc, DE (US)

( * ) Notice: Subject to any disclaimer, the term of this patent is extended or adjusted under 35 U.S.C. 154(b) by 0 days.

(21) Appl. No.: 08/793,525

(22) PCT Filed: Sep. 1, 1995

(86) PCT No.: PCT/EP95/03452

§ 371 Date: Jul. 14, 1997

§ 102(e) Date: Jul. 14, 1997

(87) PCT Pub. No.: WO96/07718

PCT Pub. Date: Mar. 14, 1996

(30) Foreign Application Priority Data

Sep. 2, 1994 (GB) .................................... 9417670

(51) Int. Cl.[7] .............................................. C10L 1/18
(52) U.S. Cl. ................................................. 44/393; 44/395
(58) Field of Search ..................... 44/393, 395; 526/331; 508/469, 475

(56) References Cited

U.S. PATENT DOCUMENTS

| 3,981,850 | * | 9/1976 | Wisotsky et al. ..................... 526/331 |
| 4,129,714 | * | 12/1978 | Colburn et al. ....................... 526/331 |
| 5,254,652 | * | 10/1993 | Reimann et al. ..................... 526/331 |
| 5,371,137 | * | 12/1994 | Blincow et al. ...................... 526/331 |

FOREIGN PATENT DOCUMENTS

| 1244512 | * | 9/1971 | (GB) . |
| 94/00536 | * | 1/1994 | (WO) . |

* cited by examiner

*Primary Examiner*—Margaret Medley
*Assistant Examiner*—Cephia D. Toomer

(57) ABSTRACT

Compositions comprising an ethylene/vinyl acetate or propionate/vinyl branched carboxylate terpolymer improve the low temperature properties of fuel oils.

11 Claims, 1 Drawing Sheet

OIL ADDITIVES COMPOSITIONS AND POLYMERS FOR USE THEREIN

Figure 1:
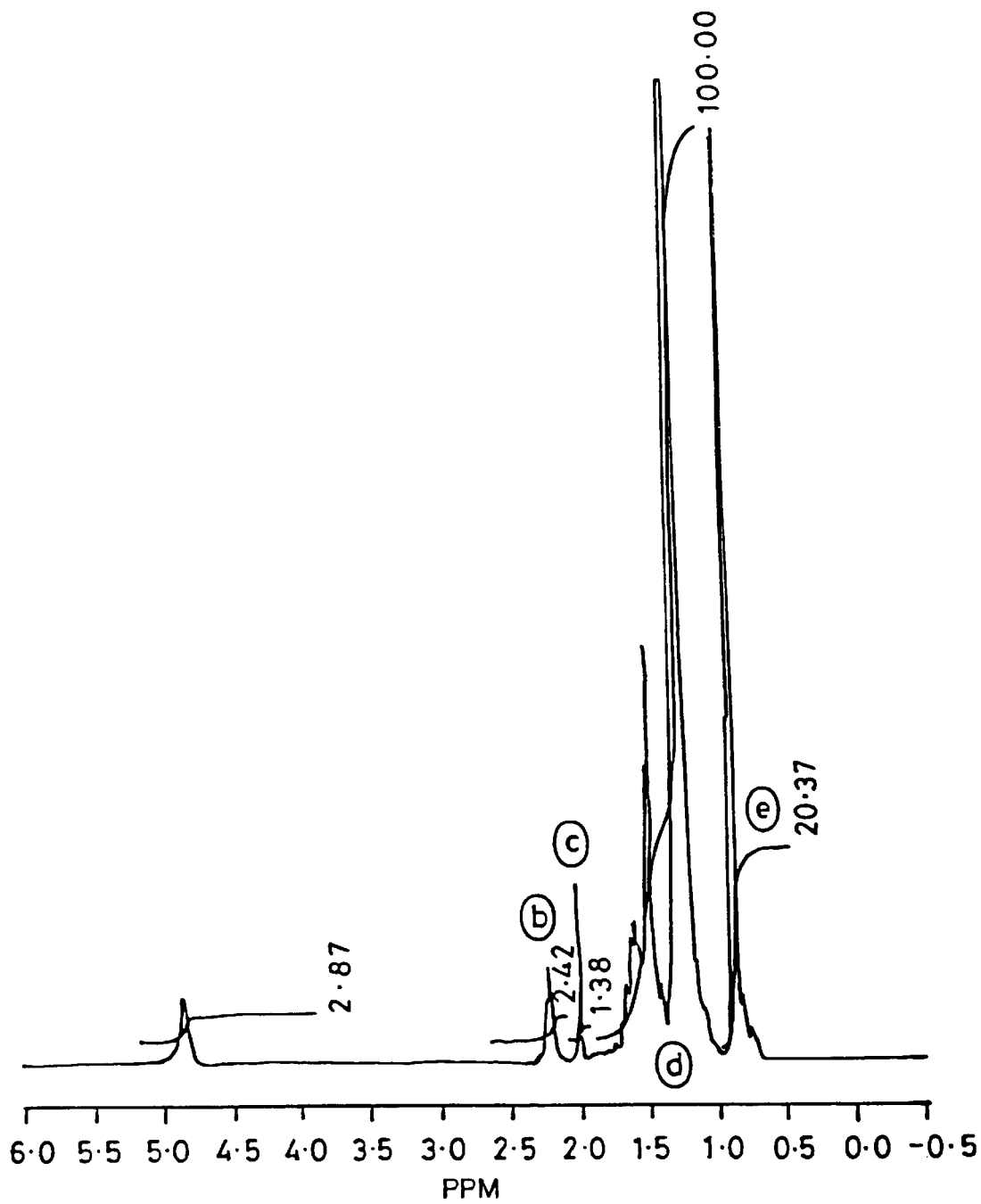

This application is a 371 of PCT/EP95/03452, filed Sep. 1, 1995.

This invention relates to oil compositions, primarily to fuel oil compositions, and more especially to fuel oil compositions susceptible to wax formation at low temperatures, to copolymers for use with such fuel oil compositions, and to methods for their manufacture.

Fuel oils, whether derived from petroleum or from vegetable sources, contain components, e.g, alkanes, that at low temperature tend to precipitate as large crystals or spherulites of wax in such a way as to form a gel structure which causes the fuel to lose its ability to flow. The lowest temperature at which the fuel will still flow is known as the pour point.

As the temperature of the fuel falls and approaches the pour point, difficulties arise in transporting the fuel through lines and pumps. Further, the wax crystals tend to plug fuel lines, screens, and filters at temperatures above the pour point. These problems are well recognized in the art, and various additives have been proposed, many of which are in commercial use, for depressing the pour point of fuel oils. Similarly, other additives have been proposed and are in commercial use for reducing the size and changing the shape of the wax crystals that do form. Smaller size crystals are desirable since they are less likely to clog a filter. The wax from a diesel fuel, which is primarily an alkane wax, crystallizes as platelets; certain additives inhibit this and cause the wax to adopt an acicular habit, the resulting needles being more likely to pass through a filter than are platelets. The additives may also have the effect of retaining in suspension in the fuel the crystals that have formed, the resulting reduced settling also assisting in prevention of blockages.

Effective wax crystal modification (as measured by cold filter plugging point (CFPP) and other operability tests, as well as simulated and field performance) may be achieved by ethylene-vinyl acetate (EVAC) or propionate copolymer-based flow improvers.

In "Wissenschaft und Technik" 42(6), 238 (1989), M. Ratsch & M. Gebauer describe cold flow additives including an EVAC which has been hydrolysed and reesterified with, inter alia, propionic, n-pentanoic and n-hexanoic acids. A preference is expressed for esterifying acids to be straight-chain; a branched chain 3-methyl butanoic acid esterified copolymer gave significantly inferior results to those obtained using n-pentanoic acid esterified material.

In JP-A-58129096, cold flow additives comprising ethylene-vinyl carboxylic acid esters are described, the esterifying acid having a total carbon atom number of from 4 to 8, the additives being especially useful in a narrow boiling middle distillate fuel oil. The degree of branching of the main chain as measured by proton NMR is said to be at least 6 alkyl branches per 100 methylene groups.

British Specification No.1,086,036, EP-A-527,322 and EP-A-518,406 describe terpolymers suitable as latices for coatings, these terpolymers being formed by copolymerising ethylene with a vinyl ester of a tertiary or quaternary aliphatic carboxylic acid and a further ester monomer which may be vinyl acetate.

British Specification No.1,314,855 describes terpolymers of ethylene, vinyl acetate and a vinyl ester of a long-chain carboxylic acid which may be a saturated carboxylic acid having 8 to 30 carbon atoms. The only branched-chain carboxylic acid specifically disclosed is isostearic acid ($C_{18}$). These terpolymers are described as useful in lubricating oils as viscosity index improvers.

British Specification No. 1,244,512 describes terpolymers of ethylene, a vinyl ester of a $C_2$ to $C_4$ monocarboxylic acid and an unsaturated ester having a $C_{10}$ to $C_{22}$ alkyl group, and preferably of the formula.

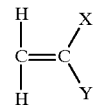

Wherein X is hydrogen or a methyl group, and Y is a OOCR or —COOR wherein R is preferably a $C_{10}$ to $C_{16}$ straight chain or branched chain alkyl group. All the specifically disclosed esters wherein Y is OOCR have straight chain alkyl groups.

In WO 94/00536, cold flow additives comprising a terpolymer of ethylene and two different unsaturated esters are disclosed. Terpolymers are also described in EP-A-493769, the starting monomers being ethylene, vinyl acetate, and vinyl neo-nonanoate or -decanoate, and in the references cited in the search report on that application.

The present invention relates to terpolymers showing a surprising improvement in wax crystal modification over those described in the prior art. Being comprised of branched chain unsaturated ester monomer units, the terpolymers useful in the present invention also enable readily available branched chain carboxylic acids to be used in the preparation of additives.

In a first aspect, the present invention provides an oil composition comprising an oil and an oil soluble ethylene terpolymer containing, in addition to units derived from ethylene, units of the formula:

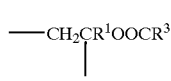

I and units of the formula

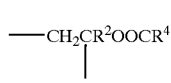

II wherein $R^1$ and $R^2$ each independently represent H or methyl; $R^3$ represents an alkyl group having up to 4 carbon atoms; and $R^4$ represents a branched chain alkyl group having from 8 to 15 carbon atoms, other than a tertiary alkyl group, or a branched chain alkyl group having at most 7 carbon atoms, $R^3$ and $R^4$ being different; the degree of branching of the terpolymer, as measured by proton NMR spectroscopy (as explained in more detail below) being less than 6 $CH_3$ groups per 100 $CH_2$ units.

In units of the formula I, $R^1$ advantageously represents hydrogen, and $R^3$ advantageously represents ethyl or, especially, methyl. Advantageously $R^3$ is not t-butyl, but otherwise may be straight-chain or branched, although it is preferred that $R^3$ is a primary or secondary alkyl group. In units of the formula II, $R^2$ advantageously represents hydrogen. Advantageously, when $R^4$ represents a branched chain alkyl group having at most 7 carbon atoms, it is not a tertiary alkyl group.

$R^4$ preferably represents a secondary alkyl group, such as isopropyl, isobutyl, secbutyl, isopentyl, neo-pentyl, 1- and 2-methyl butyl, 1,2-dimethyl and 1-ethyl propyl, isohexyl, 1-, 2- and 3-methyl pentyl, 1- and 2-ethyl hexyl, 1- and 2-methyl heptyl, 1-ethyl propyl and, especially, 1-ethyl pentyl being preferred.

Terpolymers wherein $R^3$ represents a primary or secondary alkyl group, and $R^4$ represents a secondary alkyl group are particularly preferred. In a second aspect, the invention provides an oil-soluble ethylene terpolymer containing, in addition to units derived from ethylene, units of the formula:

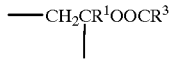  I and units of the formula

  II wherein $R^1$ and $R^2$ each independently represent H or methyl, $R^3$ represents a primary or secondary alkyl group having up to 4 carbon atoms, and $R^4$ represents a secondary alkyl group having up to 15 carbon atoms, $R^3$ and $R^4$ being different; the degree of branching of the terpolymer, as measured by proton NMR spectroscopy, being less than 6 $CH_3$ groups per 100 $CH_2$ units.

Preferably, $R^1$ and $R^2$ each represent hydrogen and $R^3$ represents a primary alkyl group.

The term "terpolymer", as used herein in relation to all aspects of the invention, requires the polymer to have at least three different repeat units, i.e., be derivable from at least three different monomers, and includes polymers derivable from four or more monomers. For example, the polymer may contain two or more different units of the formula I or II, and/or may contain units of the formula

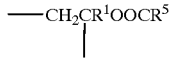  III wherein $R^5$ represents a hydrocarbyl group having 5 or more carbon atoms other than one as defined by $R^4$.

As used in this specification the term "hydrocarbyl" refers to a group having a carbon atom directly attached to the rest of the molecule and having a hydrocarbon or predominantly hydrocarbon character. Among these, there may be mentioned hydrocarbon groups, including aliphatic, (e.g., alkyl), alicyclic (e.g., cycloalkyl), aromatic, aliphatic and alicyclic-substituted aromatic, and aromatic-substituted aliphatic and alicyclic groups. Aliphatic groups are advantageously saturated. These groups may contain non-hydrocarbon substituents provided their presence does not alter the predominantly hydrocarbon character of the group. Examples include keto, halo, hydroxy, nitro, cyano, alkoxy and acyl. If the hydrocarbyl group is substituted, a single (mono) substituent is preferred. Examples of substituted hydrocarbyl groups include 2-hydroxyethyl, 3-hydroxypropyl, 4-hydroxybutyl, 2-ketopropyl, ethoxyethyl, and propoxypropyl. The groups may also or alternatively contain atoms other than carbon in a chain or ring otherwise composed of carbon atoms. Suitable hetero atoms include, for example, nitrogen, sulfur, and, preferably, oxygen. Advantageously, the hydrocarbyl group contains at most 30, preferably at most 15, more preferably at most 10 and most preferably at most 8, carbon atoms.

The terpolymer may also contain units of formulae other than those mentioned above, for example units of the formula

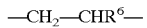  IV where $R^6$ represents —OH, or of the formula

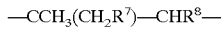  V where $R^7$ and $R^8$ each independently represent hydrogen or an alkyl group with up to 4 carbon atoms, the units V advantageously being derived from isobutylene, 2-methylbut-2-ene or 2-methylpent-2-ene.

As indicated above, the terpolymer may contain a mixture of different species of $R^3$ and/or $R^4$. It is also within the scope of the invention to provide a composition comprising a mixture of two or more terpolymers according to the first aspect of the invention.

The invention further provides the use of the terpolymer defined under the first or second aspect to improve the low temperature properties of an oil, especially the CFPP of the oil.

The invention still further provides an additive concentrate containing the terpolymer of the second aspect in admixture with an oil or a solvent miscible with oil.

In relation to all aspects of the invention, the ester-containing units of the terpolymer, more especially the units of Formulae I and II, advantageously represent from 0.3 to 35 molar per cent of the terpolymer. The terpolymer is preferably of type (i), in which the ester groups advantageously constitute from 7.5 to 35 molar per cent, preferably from 10 to 25, and more preferably from 10 to 20, and most preferably 10 to 17, molar per cent. Advantageously units of the formula I represent from 1 to 9, preferably from 2 to 7, molar percent with units of the formula II representing from 4 to 13, preferably from 6 to 13, more preferably 8–11 molar percent. Alternatively the terpolymer may be of type (ii) in which the ester groups advantageously represent up to 10, more advantageously from 0.3 to 7.5, and preferably from 3.5 to 7.0 molar per cent.

The terpolymer advantageously has a number average molecular weight, Mn, as measured by gel permeation chromatography, of at most 20,000. If the terpolymer is of type (i), its molecular weight is, generally, at most 14,000, advantageously at most 10,000, more advantageously in the range of 1,400 to 7,000, preferably 3,000 to 6,000 and most preferably from 3,500 to 5,500. If the terpolymer is of type (ii) the number average molecular weight is advantageously at most 20,000, preferably up to 15,000 and more preferably from 1,200 to 10,000, and most preferably from 3,000 to 10,000.

In the oil-containing compositions of the invention, the oil may be a crude oil, i.e. oil obtained directly from drilling and before refining.

The oil may be a lubricating oil, which may be an animal, vegetable or mineral oil, such, for example, as petroleum oil fractions ranging from naphthas or spindle oil to SAE 30, 40 or 50 lubricating oil grades, castor oil, fish oils or oxidized mineral oil. Such an oil may contain additives depending on its intended use; examples are viscosity index improvers such as ethylene-propylene copolymers, succinic acid based dispersants, metal containing dispersant additives and zinc dialkyldithiophosphate antiwear additives. The terpolymer of this invention may be suitable for use in lubricating oils as a flow improver, pour point depressant or dewaxing aid.

The oil may preferably be a fuel oil, e.g., a petroleum-based fuel oil, especially a middle distillate fuel oil. Such distillate fuel oils generally boil within the range of from 110° C. to 500° C., e.g. 150° C. to 400° C. The fuel oil may comprise atmospheric distillate or vacuum distillate, cracked gas oil, or a blend in any proportion of straight run and thermally and/or catalytically cracked distillates. The most common petroleum distillate fuels are kerosene, jet fuels, diesel fuels, heating oils and heavy fuel oils. The heating oil may be a straight atmospheric distillate, or it may contain minor amounts, e.g. up to 35 wt %, of vacuum gas oil or cracked gas oil or of both. The above-mentioned low temperature flow problem is most usually encountered with diesel fuels and with heating oils. The invention is also applicable to vegetable-based fuel oils, for example rape seed oil, used alone or in admixture with a petroleum distillate oil.

The terpolymer of the invention is especially useful in fuel oils having a relatively low wax content, e.g., a wax content below 3%, especially below 2.6%, such as 2.5, for example 2.3%, by weight at 10° C. below cloud point.

The terpolymer should preferably be soluble in the oil to the extent of at least 1000 ppm by weight per weight of oil at ambient temperature. However, at least some of the terpolymer may come out of solution near the cloud point of the oil and function to modify the wax crystals that form.

An important feature of the terpolymer according to the invention is its linearity, in the sense of the relatively small proportion of alkyl branches from the main polymer chain. This degree of branching may be expressed in terms of the number of methyl groups per 100 methylene units, as measured by proton NMR, which is, as indicated above, below 6, and advantageously below 4, especially below 2.5.

In calculating linearity, the proportion of $CH_3$ groups per 100 methylene groups is measured by proton NMR and corrected for the number of terminal methyl groups, based on the number average molecular weight, a relatively small correction, and, more importantly, for the number of methyl and methylene groups in the alkyl groups of $R^3$ and $R^4$ of the carboxylate side chains.

FIG. 1 shows a sample proton NMR spectrum for an ethylene-vinyl acetate vinyl-2-ethylhexanoate terpolymer.

As exemplified in FIG. 1, the peaks relevant to the calculation are annotated b, c, d, and e, wherein b originates for the hydrogen(s) on the carbon atom situated α to the carbonyl group on the carboxylate side chain $R^4$ (in this example, a methine carbon); c represents the equivalent hydrogen(s) on $R^3$ (in this example, methyl); d originates from the hydrogens of the methylenes and methines of the polymer main chain and carboxylate side chains, other than the main chain methine from which the carboxylate side chain depends when $R^1$ and/or $R^2$ in formula 1 represent H; and e originates from the hydrogens of the methyls of the polymer main chain and carboxylate side chains.

Representing the area under each of the peaks b, c, d and e as B, C, D and E respectively, the number of $CH_3$ units per 100 methylene groups, corrected for carboxylate side chain methyl and methylene groups, is calculated as:

$$\frac{E-6B}{3} \times \frac{2}{D-8B} \times 100$$

and this is then further corrected for the terminal methyl groups of the polymer chain by subtraction of the term $$\frac{200}{x(100+\text{Mole } E)}$$

wherein Mole E represents the mole % of ethylene in the polymer, and x represents:

$$\frac{Mn\ (D/4+E/4-3B+C/6)}{100\ (58B+24C+7D+7E)}$$

to give the degree of branching of the terpolymer.

The terpolymer may be made by any of the methods known in the art, e.g., by solution polymerization with free radical initiation, or by high pressure polymerization, conveniently carried out in an autoclave or a tubular reactor.

Advantageously, polymerization is effected in the presence of an initiator and if desired or required a molecular weight regulator at elevated pressure, e.g., between 90 and 12.5 bar (9 and 12.5 MPa) and elevated temperature, but preferably below about 130° C., for example within the range of from 90° C. to 125° C. Maintaining a temperature below the above-mentioned limit enables a polymer having the desired linearity to be obtained; other means of controlling linearity, as known in the art, may also be used.

The additive concentrate and the oil composition may contain other additives for improving low temperature and/ or other properties, many of which are in use in the art or known from the literature.

For example, the composition may also contain (A) a further ethylene-unsaturated ester, especially a vinyl ester, copolymer. As disclosed in U.S. Pat. No. 3,961,916, flow improver compositions may comprise a wax growth arrestor and a nucleating agent. Without wishing to be bound by any theory, the applicants believe that if the terpolymer of the present invention is a type (i) copolymer, and has more than about 7.5 molar per cent of ester units, it acts primarily as an arrestor, and will benefit from the addition of a nucleator, e.g., an ethylene-vinyl ester, especially acetate, copolymer having a number average molecular weight in the range of 1200 to 20000, and a vinyl ester content of 0.3 to 17 molar per cent, advantageously an ester content lower, and preferably at least 2, more preferably at least 3, molar per cent lower, than that of the esters in the terpolymer composition.

If, however, the terpolymer of the invention is a type (ii) copolymer and contains less than about 10 molar per cent of ester units then correspondingly it acts primarily as a nucleator and will benefit from the presence of an arrestor which may be an ethylene/unsaturated ester copolymer with correspondingly lower molecular weight and higher ester content.

It is also within the scope of the invention for the additional ethylene-unsaturated, especially vinyl, ester copolymer to be of the same type, (i) or (ii), as the terpolymer of the invention.

The combination of the terpolymer and the copolymer may provide surprisingly improved benefits in performance, especially in fuels having relatively low wax contents. The present invention accordingly also provides the composition of the first aspect additionally comprising one or more ethylene-unsaturated, especially vinyl, ester copolymers different from the terpolymer defined under the first aspect; and further provides an additive composition comprising the terpolymer as defined under the first aspect and one or more copolymers different from the terpolymer. Advantageously, the terpolymer and the copolymer will differ in molar ester proportion and number average molecular weight, the higher ester proportion preferably corresponding to the lower molecular weight.

The additive composition may also comprise additional cold flow improvers, including (B) a comb polymer.

Comb polymers (B) are polymers in which branches containing hydrocarbyl groups are pendant from a polymer backbone, and are discussed in "Comb-Like Polymers. Structure and Properties", N. A. Plate and V. P. Shibaev, J. Poly. Sci. Macromolecular Revs., 8, p 117 to 253 (1974).

Generally, comb polymers have one or more long chain hydrocarbyl branches, e.g., oxyhydrocarbyl branches, normally having from 10 to 30 carbon atoms, pendant from a polymer backbone, said branches being bonded directly or indirectly to the backbone. Examples of indirect bonding include bonding via interposed atoms or groups, which bonding can include covalent and/or electrovalent bonding such as in a salt.

Advantageously, the comb polymer is a homopolymer or a copolymer having at least 25 and preferably at least 40, more preferably at least 50, molar per cent of the units of which have, side chains containing at least 6, and preferably at least 10, atoms. As examples of preferred comb polymers there may be mentioned those of the general formula

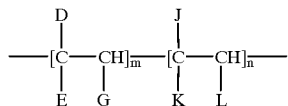

wherein
$D=R^{11}$, $COOR^{11}$, $OCOR^{11}$, $R^{12}COOR^{11}$, or $OR^{11}$,
$E=H$, $CH_3$, D, or $R^{12}$,
G=H or D
$J=H$, $R^{12}$, $R^{12}COOR^{11}$, oran aryl or heterocyclic group,
$K=H$, $COOR^{12}$, $OCOR^{12}$, $OR^{12}$ or COOH,
$L=H$, $R^{12}$, $COOR^{12}$, $OCOR^{12}$, COOH, or aryl,
$R^{11} \geq C_{10}$ hydrocarbyl,
$R^{12} \geq C_1$ hydrocarbyl or hydrocarbylene,
and m and n represent mole fractions, m being finite and preferably within the range of from 1.0 to 0.4, n being less than 1 and preferably in the range of from 0 to 0.6. $R^{11}$ advantageously represents a hydrocarbyl group with from 10 to 30 carbon atoms, while $R^{12}$ advantageously represents a hydrocarbyl or hydrocarbylene group with from 1 to 30 carbon atoms.

The comb polymer may contain units derived from other monomers if desired or required.

These comb polymers may be copolymers of maleic anhydride or fumaric or itaconic acids and another ethylenically unsaturated monomer, e.g., an α-olefin, including styrene, or an unsaturated ester, for example, vinyl acetate or homopolymer of fumaric or itaconic acids. It is preferred but not essential that equimolar amounts of the comonomers be used although molar proportions in the range of 2 to 1 and 1 to 2 are suitable. Examples of olefins that may be copolymerized with e.g., maleic anhydride, include 1-decene, 1-dodecene, Itetradecene, 1-hexadecene, and 1-octadecene.

The acid or anhydride group of the comb polymer may be esterified by any suitable technique and although preferred it is not essential that the maleic anhydride or fumaric acid be at least 50% esterified. Examples of alcohols which may be used include n-decan-1-ol, ndodecan-1-ol, n-tetradecan-1-ol, n-hexadecan-1-ol, and n-octadecan-1-ol. The alcohols may also include up to one methyl branch per chain, for example, 1-methylpentadecan1-ol or 2-methyltridecan-1-ol.

The alcohol may be a mixture of normal and single methyl branched alcohols. It is preferred to use pure alcohols rather than the commercially available alcohol mixtures but if mixtures are used the $R^{12}$ refers to the average number of carbon atoms in the alkyl group; if alcohols that contain a branch at the 1 or 2 positions are used $R^{12}$ refers to the straight chain backbone segment of the alcohol.

These comb polymers may especially be funarate or itaconate polymers and copolymers such for example as those described in EP-A-153176, -153177 and -225688, and WO 91/16407.

Particularly preferred fumarate comb polymers are copolymers of alkyl fumarates and vinyl acetate, in which the alkyl groups have from 12 to 20 carbon atoms, more especially polymers in which the alkyl groups have 14 carbon atoms or in which the alkyl groups are a mixture of $C_{14}/C_{16}$ alkyl groups, made, for example, by solution copolymerizing an equimolar mixture of fumaric acid and vinyl acetate and reacting the resulting copolymer with the alcohol or mixture of alcohols, which are preferably straight chain alcohols. When the mixture is used it is advantageously a 1:1 by weight mixture of normal $C_{14}$ and $C_{16}$ alcohols. Furthermore, mixtures of the $C_{14}$ ester with the mixed $C_{14}/C_{16}$ ester may advantageously be used. In such mixtures, the ratio Of $C_{14}$ to $C_{14}/C_{16}$ is advantageously in the range of from 1:1 to 4:1, preferably 2:1 to 7:2, and most preferably about 3:1, by weight. The particularly preferred comb polymers are those having a number average molecular weight, as measured by vapour phase osmometry, of 1,000 to 100,000, more especially 1,000 to 30,000.

Other suitable comb polymers are the polymers and copolymers of α-olefins and esterified copolymers of styrene and maleic anhydride, and esterified copolymers of styrene and fumaric acid; mixtures of two or more comb polymers may be used in accordance with the invention and, as indicated above, such use may be advantageous, other examples of comb polymers are hydrocarbon polymers, e.g., copolymers of ethylene and at least one α-olefin, the a-olefin preferably having at most 20 carbon atoms, examples being n-decene-1 and n-dodecene-1. Preferably, the number average molecular weight of such a copolymer is at least 30,000 measured by GPC. The hydrocarbon copolymers may be prepared by methods known in the art, for example using a Ziegler type catalyst.

Other additives for improving low temperature properties are:

(C) Polar nitrogen compounds. Such compounds are oil-soluble polar nitrogen compounds carrying one or more, preferably two or more, substituents of the formula $>NR^{13}$, where $R^{13}$ represents a hydrocarbyl group containing 8 to 40 atoms, which substituent or one or more of which substituents may be in the form of a cation derived therefrom. The oil soluble polar nitrogen compound is generally one capable of acting as a wax crystal growth inhibitor in fuels. it comprises for example one or more of the following compounds:

An amine salt and/or amide formed by reacting at least one molar proportion of a hydrocarbyl-substituted amine with a molar proportion of a hydrocarbyl acid having from 1 to 4 carboxylic acid groups or its anhydride, the substituent (s) of formula $>NR^{13}$ being of the formula $—NR^{13}R^{14}$ where $R^{13}$ is defined as above and $R^{14}$ represents hydrogen or $R^{13}$, provided that $R^{13}$ and $R^{14}$ may be the same or different, said substituents constituting part of the amine salt and/or amide groups of the compound.

Ester/amides may be used, containing 30 to 300, preferably 50 to 150, total carbon atoms. These nitrogen compounds are described in U.S. Pat. No. 4,211,534. Suitable amines are predominantly $C_{12}$ to $C_{40}$ primary, secondary, tertiary or quaternary amines or mixtures thereof but shorter chain amines may be used provided the resulting nitrogen compound is oil soluble, normally containing about 30 to 300 total carbon atoms. The nitrogen compound preferably contains at least one straight chain $C_8$ to $C_{40}$, preferably $C_{14}$ to $C_{24}$, alkyl segment.

Suitable amines include primary, secondary, tertiary or quaternary, but are preferably secondary. Tertiary and quaternary amines only form amine salts. Examples of amines include tetradecylamine, cocoamine, and hydrogenated tallow amine. Examples of secondary amines include dioctacedyl amine and methylbehenyl amine. Amine mixtures are also suitable such as those derived from natural materials. A preferred amine is a secondary hydrogenated tallow amine, the alkyl groups of which are derived from hydrogenated tallow fat composed of approximately 4% C14, 31% $C_{16}$, and 59% $C_{18}$.

Examples of suitable carboxylic acids and their anhydrides for preparing the nitrogen compounds include ethylenediamine tetraacetic acid, and carboxylic acids based on cyclic skeletons, e.g., cyclohexane-1,2-dicarboxylic acid, cyclohexene-1,2-dicarboxylic acid, cyclopentane-1,2-dicarboxylic acid and naphthalene dicarboxylic acid, and 1,4-dicarboxylic acids including dialkyl spirobislactones. Generally, these acids have about 5 to 13 carbon atoms in the cyclic moiety. Preferred acids useful in the present invention are benzene dicarboxylic acids e.g., phthalic acid, isophthalic acid, and terephthalic acid. Phthalic acid and its anhydride are particularly preferred. The particularly preferred compound is the amide-amine salt formed by reacting 1 molar portion of phthalic anhydride with 2 molar portions of dihydrogenated tallow amine. Another preferred compound is the diamide formed by dehydrating this amide-amine salt.

Other examples are long chain alkyl or alkylene substituted dicarboxylic acid derivatives such as amine salts of monoamides of substituted succinic acids, examples of which are known in the art and described in U.S. Pat. No. 4,147,520, for example. Suitable amines may be those described above.

Other examples are condensates, for example, those described in EP-A-327427.

(D) A compound containing a cyclic ring system carrying at least two substituents of the general formula below on the ring system

where A is a linear or branched chain aliphatic hydrocarbylene group optionally interrupted by one or more hetero atoms, and $R^{15}$ and $R^{16}$ are the same or different and each is independently a hydrocarbyl group containing 9 to 40 atoms optionally interrupted by one or more hetero atoms, the substituents being the same or different and the compound optionally being in the form of a salt thereof. Advantageously, A has from 1 to 20 carbon atoms and is preferably a methylene or polymethylene group. Such compounds are described in WO 93/04148.

(E) A hydrocarbon polymer. Examples of suitable hydrocarbon polymers are those of the general formula

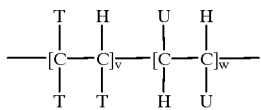

wherein
T=H or $R^{21}$ wherein
$R^{21}=C_1$ to $C_{40}$ hydrocarbyl, and
U=H, T, or aryl
and v and w represent mole fractions, v being within the range of from 1.0 to 0.0, w being in the range of from 0.0 to 1.0.

The hydrocarbon polymers may be made directly from monoethylenically unsaturated monomers or indirectly by hydrogenating polymers from polyunsaturated monomers, e.g., isoprene and butadiene.

Examples of hydrocarbon polymers are disclosed in WO 91/11488.

Preferred copolymers are ethylene α-olefin copolymers, having a number average molecular weight of at least 30,000. Preferably the α-olefin has at most 28 carbon atoms. Examples of such olefins are propylene, ibutene, isobutene, n-octene-1, isooctene-1, n-decene-1, and n-dodecene-1. The copolymer may also comprise small amounts, e.g, up to 10% by weight, of other copolymerizable monomers, for example olefins other than α-olefins, and non-conjugated dienes. The preferred copolymer is an ethylene-propylene copolymer.

The number average molecular weight of the ethylene α-olefin copolymer is, as indicated above, preferably at least 30,000, as measured by gel permeation chromatography (GPC) relative to polystyrene standards, advantageously at least 60,000 and preferably at least 80,000. Functionally no upper limit arises but difficulties of mixing result from increased viscosity at molecular weights above about 150,000, and preferred molecular weight ranges are from 60,000 and 80,000 to 120,000.

Advantageously, the copolymer has a molar ethylene content between 50 and 85 per cent. More advantageously, the ethylene content is within the range of from 57 to 80%, and preferably it is in the range from 58 to 73%; more preferably from 62 to 71%, and most preferably 65 to 70%.

Preferred ethylene α-olefin copolymers are ethylene-propylene copolymers with a molar ethylene content of from 62 to 71% and a number average molecular weight in the range 60,000 to 120,000; especially preferred copolymers are ethylene-propylene copolymers with an ethylene content of from 62 to 71% and a molecular weight from 80,000 to 100,000.

The copolymers may be prepared by any of the methods known in the art, for example using a Ziegler type catalyst. The polymers should be substantially amorphous, since highly crystalline polymers are relatively insoluble in fuel oil at low temperatures.

Other suitable hydrocarbon polymers include a low molecular weight ethylene-α-olefin copolymer, advantageously with a number average molecular weight of at most 7,500, advantageously from 1,000 to 6,000, and preferably from 2,000 to 5,000, as measured by vapour phase osmometry. Appropriate α-olefins are as given above, or styrene, with propylene again being preferred. Advantageously the ethylene content is from 60 to 77 molar per cent, although for ethylene-propylene copolymers up to 86 molar per cent by weight ethylene may be employed with advantage.

(F) A polyoxyalkylene compound. Examples are polyoxyalkylene esters, ethers, ester/ethers and mixtures thereof, particularly those containing at least one, preferably at least two, $C_{10}$ to $C_{30}$ linear alkyl groups and a polyoxyalkylene glycol group of molecular weight up to 5,000, preferably 200 to 5,000, the alkyl group in said polyoxyalkylene glycol containing from 1 to 4 carbon atoms. These materials form the subject of EP-A-0 061 895. Other such additives are described in U.S. Pat. No. 4,491,455.

The preferred esters, ethers or ester/ethers are those of the general formula $$R^{31}\text{—O(D)—O—}R^{32}$$

where $R^{31}$ and $R^{32}$ may be the same or different and represent (a) n-alkyl-
(b) n-alkyl-CO—
(c) n-alkyl-O—CO$(CH_2)_x$—or
(d) n-alkyl-O—CO$(CH_2)_x$—CO— x being, for example, 1 to 30, the alkyl group being linear and containing from 10 to 30 carbon atoms, and D representing the polyalkylene segment of the glycol in which the alkylene group has 1 to 4 carbon atoms, such as a polyoxymethylene, polyoxyethylene or polyoxytrimethylene moiety which is substantially linear; some degree of branching with lower alkyl side chains (such as in polyoxypropylene glycol) may be present but it is preferred that the glycol is substantially linear. D may also contain nitrogen.

Examples of suitable glycols are substantially linear polyethylene glycols (PEG) and polypropylene glycols (PPG) having a molecular weight of from 100 to 5,000, preferably from 200 to 2,000. Esters are preferred and fatty acids containing from 10–30 carbon atoms are useful for reacting with the glycols to form the ester additives, it being preferred to use a $C_{18}$–$C_{24}$ fatty acid, especially behenic acid. The esters may also be prepared by esterifying polyethoxylated fatty acids or polyethoxylated alcohols.

Polyoxyalkylene diesters, diethers, ether/esters and mixtures thereof are suitable as additives, diesters being preferred for use in narrow boiling distillates, when minor amounts of monoethers and monoesters (which are often formed in the manufacturing process) may also be present. It is preferred that a major amount of the dialkyl compound be present. In particular, stearic or behenic diesters of polyethylene glycol, polypropylene glycol or polyethylene/polypropylene glycol mixtures are preferred.

Other examples of polyoxyalkylene compounds are those described in Japanese Patent Publication Nos. 2-51477 and 3-34790, and the esterified alkoxylated amines described in EP-A-117,108 and EP-A-326,356.

It is within the scope of the invention to use two or more additional flow improvers advantageously selected from one or more of the different classes A to E outlined above.

The additional flow improver is advantageously employed in a proportion within the range of from 0.01% to 1%, advantageously 0.05% to 0.5%, and preferably from 0.075 to 0.25%, by weight, based on the weight of fuel.

The flow improver of the invention may also be used in combination with one or more other co-additives such as known in the art, for example the following: detergents, particulate emission reducers, storage stabilizers, antioxidants, corrosion inhibitors, dehazers, demulsifiers, antifoaming agents, cetane improvers, cosolvents, package compatibilizers, and lubricity additives.

The oil, preferably fuel oil, composition of the invention advantageously contains a terpolymer of the invention in a proportion of 0.0005% to 1%, advantageously 0.001 to 0.1%, and preferably 0.02 to 0.06% by weight, based on the weight of oil. In the low wax fuel oil to which the present invention is especially applicable the proportion is advantageously from 0.005 to 0.2%, preferably about 0.01%, by weight, based on the weight of the fuel oil.

Additive concentrates according to the invention advantageously contain between 3 and 75%, preferably between 10 and 65%, of the terpolymer in an oil or a solvent miscible with oil.

The following Examples, in which all parts and percentages are by weight, and number average molecular weights (Mn) are measured by gel permeation chromatography with polystyrene as standard, illustrate the invention.

EXAMPLES 1 TO 4

Preparation of Terpolymer

EXAMPLE 1

An autoclave was charged with 782 ml (610 g) cyclohexane, 89 ml (78.2 g) vinyl 2-ethylhexanoate (V2EH) and 42.5 ml (30 g) vinyl acetate (VAC). The vessel was pressurized to 9.7 MPa with ethylene and the temperature of the solution raised to 123° C., this pressure and temperature being maintained throughout the reaction. A mixture of 212 ml vinyl 2-ethylhexanoate and 102 ml vinyl acetate was injected into the autoclave over 75 minutes, as were 9.1 ml t-butyl per-2-ethylhexanoate dissolved in 58.2 ml cyclohexane. The vessel was heat soaked for 10 minutes at 123° C. at the end of the injection, and the reaction mixture drained from the autoclave. Unreacted monomers and solvents were removed by vacuum distillation, and 600 g of opaque, viscous polymer recovered.

Further terpolymers were prepared according to the general procedure given above, the temperature being varied as set out in Table 1 below and the proportions of monomers being varied to give polymers also as set out in the Table.

TABLE 1

| Example | Temp., ° C. | $CH_3/100$ $CH_2$ | Mn | V2 EH mole % | VAC mole % |
|---------|-------------|-------------------|------|--------------|------------|
| 1 | 123 | 4.0* | 3780 | 7.4 | 5.3 |
| 2 | 115 | 4.0* | 4030 | 12.8 | 1.2 |
| 3 | 90  | 2.24 | 5690 | 9.32 | 2.88 |
| 4 | 105 | 0.25 | 4700 | 7.89 | 7.73 |

*Not corrected for terminal methyl groups.

COMPARISON EXAMPLES 1 TO 3

In these examples, an ethylene-vinyl octanoate (VnO in the Table below) copolymer was prepared using reaction conditions as described for Example 1, as indicated in Table 2 below.

TABLE 2

| Example | Temp. ° C. | $CH_3/100$ $CH_2$ | Mn | VnO |
|---------|------------|-------------------|------|------|
| Comp 1 | 123 | 4.4 | 3720 | 15.5 |

In addition, for comparison purposes, a commercially available ethylene-vinyl acetate, with about 11.9 mole VA, Mn 3000, $CH_3/100$ $CH_2$ 3.3, was used as Comp. 2, and a composition commercially available from Hoechst AG. under the trade mark DODIFLOW 4159, and believed to contain a terpolymer according to EP-A-493769, was used as Comp. 3.

In the Examples below, Fuels 1 and 2 as listed in Table 3 below were ed. The CFPP of each fuel is measured as described in "Journal of the te of Petroleum", 52 (1966), 173.

TABLE 3

| Fuel | 1 | 2 |
| --- | --- | --- |
| Cloud Point, ° C. | −3 | −6 |
| CFPP, ° C. | −4 | −8 |
| IBP, ° C. | 174 | 154 |
| FBP, ° C. | 369 | 361 |
| 90–20° C. | 110 | 80 |
| FBP–90° C. | 26 | 31 |
| Wax content at 10° C. below cloud point, wt % | 2.0 | 3.4 |

EXAMPLES 5 TO 8 AND COMP. 4 TO 6

Tests on Fuels—Effect on CFPP

In these Examples, the effect of terpolymer products according to the invention on the CFPP of the two fuels identified above as Fuels 1 and 2 was measured.

The additives were used at a treat rate of 100 ppm and 400 ppm of active ingredient in Fuels 1 and 2 respectively. The results are set out in Table 4 below:

TABLE 4

| | Polymer of | CFPP,° C. | |
| Example | Example | Fuel 1 | Fuel 2 |
| --- | --- | --- | --- |
| — | — | −4 | −8 |
| 5 | 1 | −15.5 | −11.5 |
| 6 | 2 | −15 | −14 |
| 7 | 3 | −19 | −14 |
| 8 | 4 | −19 | −13 |
| Comp 4 | Comp 1 E-Voctanoate | −11 | −16.5 |
| Comp 5 | Comp 2 E-Vacetata | −16.5 | −11 |
| Comp 6 | Comp 3 E-neo | −8.5 | −14.5 |

Each result given above is the average of at least two experiments.

The results show the superiority of the terpolymer of the invention over an ethylene-vinyl octanoate copolymer, i.e., one. in which the alkyl group on the side chain is linear, and the commercially available terpolymer with a tertiary alkyl group, in the lower wax, higher cloud point, Fuel 1.

EXAMPLES 9 TO 12 AND COMPARATIVE EXAMPLE 7

In the above Examples 5 to 8 and the corresponding comparisons, the terpolymers were used alone. In the following examples, they were used, in the same fuels, in admixture with an equal weight of the ethylene-vinyl acetate copolymer designated Comp. 2 above. In Fuel 1 the two additives were each used at rate of 50 ppm, active ingredient, while in Fuel 2 the treat rate was 200 ppm of each additive. The results are shown in Table 5 below:

TABLE 5

| | Polymer of | CFPP, ° C. | |
| Example | Example | Fuel 1 | Fuel 2 |
| --- | --- | --- | --- |
| 9 | 1 | −18 | −10 |
| 10 | 2 | −18 | −12 |
| 11 | 3 | −18.5 | −12 |
| 12 | 4 | −18.5 | −13 |
| Comp 7 | Comp 1 | −17 | −15 |

The results show an unexpected advantage for the combination of the terpolymer of the invention and the commercial EVAC, in Fuel 1.

What is claimed is:

1. An oil composition comprising an oil having a wax content of at most 3% measured at 10° C. below cloud point, and an 0.005 to 0.2 wt. % of oil-soluble ethylene terpolymer containing, in addition to units derived from ethylene, units of the formula:

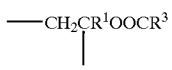
$$\text{—CH}_2\text{CR}^1\text{OOCR}^3 \qquad \text{I}$$

and units of the formula

$$\text{—CH}_2\text{CR}^2\text{OOCR}^4 \qquad \text{II}$$

wherein $R^1$ and $R^2$ each represent H, $R^3$ represents methyl; and $R^4$ represents a branched chain alkyl group having from 8 to 15 carbon atoms, other than a tertiary alkyl group, or a branched chain alkyl group having at most 7 carbon atoms, the degree of branching of the terpolymer, as measured by proton NMR spectroscopy, being less than 6 $CH_3$ groups per 100 $CH_2$ units.

2. The composition of claim 1, wherein $R^4$ represents 1-ethyl pentyl or 1-ethyl propyl.

3. The composition of claim 1, wherein the terpolymer has a number average molecular weight (Mn), measured by gel permeation chromatography, of at most 20,000.

4. The composition of claim 1, wherein the total molar proportion of units I and II is within the range of from 10 to 25 percent, and Mn is within the range of from 3,000 to 6,000.

5. The composition of claim 1, wherein the total molar proportion of units I and II is within the range of from 3.5 to 7 molar percent, and Mn is within the range of from 3,000 to 10,000.

6. The composition of claim 1, additionally comprising one or more ethylene-unsaturated ester copolymers different from the terpolymer as defined in said claim 1.

7. A method of improving the low temperature flow properties of an oil having a wax content of at most 3% measured at 10° C. below cloud point, the method comprising adding to said oil 0.005 to 0.2 wt. % of an oil-soluble ethylene terpolymer containing, in addition to units derived from ethylene, units of the formula:

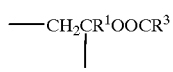

(I)

and units of the formula

(II)

wherein $R^1$ and $R^2$ each represent H; $R^3$ represents methyl; and $R^4$ represents a branched chain alkyl group having from 8 to 15 carbon atoms, other than a tertiary alkyl group, or a branched chain alkyl group having at most 7 carbon atoms, the degree of branching of the terpolymer, as measured by proton NMR spectroscopy, being less than 6 $CH_3$ groups per 100 $CH_2$ units.

8. The method according to claim 7 wherein $R^4$ represents 1-ethyl pentyl or 1-ethyl propyl.

9. The method according to claim 7 wherein the terpolymer has a number average molecular weight (Mn), measured by gel permeation chromatography, of at most 20,000.

10. The method according to claim 7 wherein the terpolymer contains units derived from ethylene, vinyl acetate and vinyl-2-ethylhexanoate.

11. The composition of claim 1 wherein the terpolymer contains units derived from ethylene, vinyl acetate and vinyl-2-ethylhexanoate.

\* \* \* \* \*